United States Patent [19]

Tilles

[11] 3,742,005

[45] June 26, 1973

[54] HERBICIDAL THIOLCARBAMATES

[75] Inventor: Harry Tilles, El Cerrito, Calif.

[73] Assignee: Stauffer Chemical Company, New York, N.Y.

[22] Filed: Dec. 14, 1970

[21] Appl. No.: 98,075

Related U.S. Application Data

[63] Continuation-in-part of Ser. No. 888,821, Dec. 29, 1969, abandoned.

[52] U.S. Cl. ............................. 260/455 A, 71/100
[51] Int. Cl. ......................................... C07c 155/08
[58] Field of Search.................. 260/455 A; 71/100, 71/101

[56] References Cited
UNITED STATES PATENTS

| | | | |
|---|---|---|---|
| 3,318,676 | 5/1967 | Harman et al. | 71/100 |
| 2,992,091 | 7/1961 | Harman et al. | 260/455 A |
| 3,175,897 | 3/1965 | Tilles et al. | 71/100 |

FOREIGN PATENTS OR APPLICATIONS

| | | | |
|---|---|---|---|
| 630,607 | 11/1961 | Canada | 71/101 |
| 724,671 | 12/1965 | Canada | 71/100 |
| 219,675 | 2/1958 | Australia | 71/100 |

OTHER PUBLICATIONS

Cambi et al., "Magnetism and Polymorphism of Inner Complex Salts etc.," (1937) CA 32 p. 1989 (1938).

*Primary Examiner*—Lewis Gotts
*Assistant Examiner*—G. Hollrah
*Attorney*—Daniel C. Block, Edwin H. Baker, Albert J. Adamcik and Harry A. Pacini

[57] ABSTRACT

Novel N,N-dialkylthiocarbamates, in hich the N-bonded alkyl radicals are different, are disclosed. The compounds are useful as herbicides.

1 Claim, No Drawings

HERBICIDAL THIOLCARBAMATES

This application is a continuation in part of my co-pending application, Ser. No. 888,821, filed Dec. 29, 1969, now abandoned.

BACKGROUND OF THE INVENTION

This invention relates to certain novel compositions and to their use as herbicides. More particularly, the invention relates to certain N,N-dialkylthiocarbamates wherein the two N-bonded alkyl radicals are different, and the use of these materials as herbicides.

SUMMARY OF THE INVENTION

The compounds of the present invention have the formula

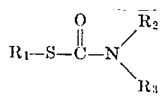

wherein $R_1$ is a member selected from the group consisting of lower alkyl, preferably having one to six carbon atoms, halo-lower alkyl, preferably having one to six carbon atoms and benzyl; $R_2$ is selected from the group consisting of methyl, ethyl, n-butyl, and allyl, and $R_3$ is selected from the group consisting of isobutyl, t-butyl, and amyl. A preferred grouping of the compositions is that in which $R_1$ is selected from the group consisting of alkyl containing one to six carbon atoms and halo-lower alkyl of one to six carbon atoms. The term "halo" used in describing the present invention encompasses the moieties chloro-, bromo-, iodo-, and fluoro-, and includes poly- as well as mono-substituted.

In general, the method of the invention comprises contacting undesired vegetation or a locus to be protected with an effective or herbicidal amount of a composition having the formula above indicated.

DETAILED DESCRIPTION OF THE INVENTION

Broadly, the compounds of the invention may be prepared by reacting a compound of the formula

wherein $R_1$ is as above indicated with a compound of the formula

wherein $R_2$ and $R_3$ are as above indicated. The concentrations of the reactants employed are not particularly critical, although generally an excess of the amine will be employed. A suitable concentration will be from about 1.0 mol to about 2.5 mols of the amine per mol of thio acid halide, although additional quantities may be present.

The reactions are preferably carried out in a solvent for the reactants. Suitable solvents include water, ether, benzene, chloroform or tetrahydrofuran. Reactions of this type are normally exothermic so that the addition of heat is not required. In actuality, cooling is sometimes required to control the reaction rate. The reaction will normally be carried out at a temperature of from about −15° C to about 55° C. Pressures may be atmospheric, subatmospheric or greater than atmospheric, as desired.

The following examples illustrate methods by which the compounds of the invention can be made.

EXAMPLE 1

Preparation of S-methyl isobutylethylthiocarbamate

About 10.6 grams of ethylisobutylamine, 10.6 grams of triethylamine, 100 cc. of ethyl ether and 100 cc. of water are charged into a flask and 11.1 grams of methyl chloro thiolformate are added over a five-minute period. The initial temperature is about 18.5° and is regulated by cooling. The mixture is stirred for about 15–20 minutes, by which time the reaction is substantially complete. The mixture is then phase-separated and the ether phase is washed with dilute HCl and then with water. The ether phase is then dried over $MgSO_4$, filtered and concentrated for a very short period of time on a rotary evaporator. The concentrate is then fractionally distilled through an 18 inch Podbielniak column to obtain S-methyl isobutylethylthiocarbamate. Structure is confirmed by elemental analysis.
Anal. Calc'd. for $C_8H_{17}NOS$: C, 54.81; H, 9.77; N, 7.99
Found: C, 55.12; H, 10.17; N, 7.99

EXAMPLE 2

Preparation of S-ethyl ethylisobutylthiocarbamate

The general procedure of Example 1 is repeated except that 10.6 grams of N-ethyl isobutylamine and 12.5 grams of ethyl chlorothiolformate is employed. There is obtained S-ethyl ethylisobutylthiocarbamate.

EXAMPLE 3

Preparation of S-2-chloroethyl ethylisobutylthiocarbamate

The general procedure of Example 1 is repeated except that 15.9 grams of 2-chloroethyl chlorothiolformate and 10.6 grams of N-ethylisobutylamine are employed.

EXAMPLE 4

Preparation of S-3-chloropropyl ethylisobutylthiocarbamate

The general procedure of Example 1 is repeated, except that 10.4 grams of 3-chloropropyl chlorothiolformate and 6.4 grams of ethyl isobutylamine are employed.

EXAMPLE 5

Preparation of S-benzyl ethylisobutylthiocarbamate

When the general procedure of Example 1 is repeated, except that 7.5 grams of N-ethylisobutylamine and 13.1 grams of benzyl chlorothiolformate are employed, there is obtained S-benzyl ethylisobutylthiocarbamate.

EXAMPLE 6

Preparation of S-butyl ethyl t-butylthiocarbamate

The general procedure of Example 1 is repeated, except that 15.2 grams of butyl chlorothiolformate and 10.6 grams of ethyl t-butylamine are employed.

EXAMPLE 7

Preparation of S-3-chloropropyl methylamylthiocarbamate

When the general procedure of Example 1 is repeated, except that 7.5 grams of N-methylamylamine and 11.2 grams of 3-chloropropyl chlorothiolformate are employed, there is obtained S-3-chloropropyl methylamyl thiocarbamate.

The following is a table of preferred compounds which may be prepared according to the invention.

TABLE I

1. S-methyl ethylisobutylthiocarbamate
2. S-ethyl ethylisobutylthiocarbamate
3. S-propyl ethylisobutylthiocarbamate
4. S-isopropyl ethylisobutylthiocarbamate
5. S-butyl ethylisobutylthiocarbamate
6. S-t-butyl ethylisobutylthiocarbamate
7. S-sec-butyl ethylisobutylthiocarbamate
8. S-isobutyl ethylisobutylthiocarbamate
9. S-3-chloropropyl ethylisobutylthiocarbamate
10. S-benzyl ethylisobutylthiocarbamate
11. S-methyl ethyl-t-butylthiocarbamate
12. S-ethyl ethyl-t-butylthiocarbamate
13. S-propyl ethyl-t-butylthiocarbamate
14. S-isopropyl ethyl-t-butylthiocarbamate
15. S-butyl ethyl-t-butylthiocarbamate
16. S-benzyl ethyl-t-butylthiocarbamate
17. S-methyl methylamylthiocarbamate
18. S-ethyl methylamylthiocarbamate
19. S-propyl methylamylthiocarbamate
20. S-butyl methylamylthiocarbamate
21. S-methyl ethylamylthiocarbamate
22. S-ethyl ethylamylthiocarbamate
23. S-propyl ethylamylthiocarbamate
24. S-butyl ethylamylthiocarbamate
25. S-isopropyl methylamylthiocarbamate
26. S-isobutyl methylamylthiocarbamate
27. S - sec - butyl methylamylthiocarbamate
28. S-t-butyl methylamylthiocarbamate
29. S-3-chloropropyl methylamylthiocarbamate
30. S-isopropyl ethylamylthiocarbamate
31. S-isobutyl ethylamylthiocarbamate
32. S - sec - butyl ethylamylthiocarbamate
33. S-t-butyl ethylamylthiocarbamate
34. S-3-chloropropyl ethylamylthiocarbamate
35. S-methyl butylisobutyl thiocarbamate
36. S-ethyl butylisobutylthiocarbamate
37. S-propyl butylisobutylthiocarbamate
38. S-isopropyl butylisobutylthiocarbamate
39. S-butyl butylisobutylthiocarbamate
40. S-isobutyl butylisobutylthiocarbamate
41. S - sec - butyl butylisobutylthiocarbamate
42. S-3 chloropropyl butylisobutylthiocarbamate
43. S-benzyl butylisobutylthiocarbamate
44. S-3-chloropropyl allylbutylthiocarbamate
45. S-3-chloropropyl allylisobutylthiocarbamate As previously indicated, the compositions of the invention are phytotoxic compounds which are useful and valuable in controlling various plant species. Several of the compounds exhibit superiority with respect to particular plant species as compared with other similar materials. Compounds 1 through 10 were tested in the following manner.

Seeds of crabgrass, annual bluegrass, watergrass, red oats, pigweed, mustard and curly dock were planted in individual rows about one-half inch deep in sandy loam soil contained in 8-¼ inch × 6-½ inch × 2-¾ inch flats. Enough seeds were planted to give about thirty to fifty plants of each of the weed species in each flat and the flats were watered after planting. The following day, each flat was sprayed at the rate of 20 pounds in 80 gallons of solution per acre of the given test composition. The flats were placed in a greenhouse at 80° F and watered regularly. Two weeks later, the degree of weed control was determined by comparing the amount of germination and growth of each weed in the treated flats with weeds in several untreated control flats. The results of this test are reported in Table II.

An additional number of compounds of the invention were tested in a similar manner on seeds of crabgrass, foxtail, watergrass, wild oats, and pigweed. The results of this test are shown in Table III, using a scale of 0 to 10 to show the rate of kill.

TABLE III

| Compound No. | Crabgrass | Foxtail | Watergrass | Wild Oats | Pigweed |
|---|---|---|---|---|---|
| 13 | 9 | 9 | 9 | 9 | 0 |
| 16 | 9 | 9 | 9 | 9 | 9 |
| 18 | 9 | 9 | 9 | 9 | 3 |
| 20 | 9 | 6 | 9 | 9 | 9 |
| 22 | 9 | 9 | 9 | 9 | 9 |
| 36 | 9 | 9 | 9 | 9 | 9 |
| 42 | 9 | 9 | 9 | 9 | 6 |
| 43 | 9 | 9 | 9 | 9 | 9 |

As can be seen by the test results, the compounds of the invention are useful as herbicides. Several of the compounds of the invention have also proven effective in post-emergent treatment. The compounds may be applied directly to the particular undesired plant species or may be applied to a locus to be protected. In either event, it is, of course, necessary that the unwanted species receive an effective dosage of amount, i.e., an amount sufficient to kill or retard growth.

The compounds are normally employed with a suitable carrier and may be applied as a dust, spray, drench TABLE II
Pre-emergence activity rate: 20 lbs./a.

| Compound number | Crabgrass (Digitaris sanguinalis) | Foxtail (Setaria glauca) | Watergrass (Echinochloa crusgalli) | Red oats (Avena byzantina) | Pigweed (Amaranthus retroflexus) | Mustard (Brassica juncea) | Curled dock (Rumex crispus) |
|---|---|---|---|---|---|---|---|
| 1 | ++ | +++ | +++ | +++ | ++ | 0 | 0 |
| 2 | +++ | +++ | +++ | +++ | +++ | + | + |
| 3 | +++ | +++ | +++ | +++ | ++ | ++ | ++ |
| 4 | +++ | ++ | +++ | +++ | ++ | 0 | 0 |
| 5 | +++ | +++ | +++ | +++ | +++ | +++ | +++ |
| 6 | +++ | +++ | ++ | +++ | + | 0 | 0 |
| 7 | +++ | +++ | +++ | +++ | +++ | 0 | ++ |
| 8 | +++ | +++ | +++ | +++ | +++ | ++ | ++ |
| 9 | +++ | +++ | +++ | +++ | +++ | ++ | ++ |
| 10 | +++ | +++ | +++ | +++ | +++ | +++ | +++ |

+ = slight injury.
++ = moderate injury.
+++ = severe injury or death.

or aerosol. The compounds thus may be applied in combination with solvents, diluents, various surface active agent (for example, detergents, soaps or other emulsifying or wetting agents, surface active clays), carrier media, adhesives, spreading agents, humectants and the like. They may also be combined with other biologically active compositions, including other herbicides, fungicides, bactericides and algaecides, insecticides, growth stimulators, acaricides, molluscicides, etc., as well as with fertilizers, soil modifiers, etc. The compounds of the invention may be used in combination with an inert carrier and a surface active or emulsifying agent and may also be applied in combination with other biologically active materials, in conjunction with a carrier and a surface active or emulsifying agent.

The solid and liquid formulations can be prepared by any of the conventional methods well known by those skilled in the art. Determination of the optimum effective concentration for a specific application is readily conducted by routine procedures, as will be apparent to those skilled in the art. As indicated, the amount applied in a given case will be an effective amount, i.e., an amount sufficient to give the type of control desired.

Various changes and modifications may be made without departing from the spirit and the scope of the invention described herein, as will be apparent to those skilled in the art to which it pertains.

I claim:
1. S-benzyl-N,N-ethylisobutylthiocarbamate.

* * * * *